(No Model.)

D. McQUEEN.
TIME STOCK FEEDER.

No. 493,219. Patented Mar. 7, 1893.

WITNESSES
Carroll J. Webster
Floyd R. Webster

INVENTOR
Daniel McQueen
By William Webster
Atty

UNITED STATES PATENT OFFICE.

DANIEL McQUEEN, OF TOLEDO, OHIO, ASSIGNOR TO GEORGE MILLER, JR., OF SAME PLACE.

TIME STOCK-FEEDER.

SPECIFICATION forming part of Letters Patent No. 493,219, dated March 7, 1893.

Application filed March 23, 1892. Serial No. 426,090. (No model.)

*To all whom it may concern:*

Be it known that I, DANIEL McQUEEN, of Toledo, county of Lucas, and State of Ohio, have invented certain new and useful Improvements in Automatic Stock-Feeders; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an automatic stock feeder and has for its object to provide mechanism whereby a suitable quantity of feed shall be deposited automatically at any predetermined time.

A further object is to provide an inexpensive and accurate means for operating a plurality of feed boxes in order to be enabled to feed any desired number of animals at the same time.

The invention consists in the parts, and combination of parts hereinafter described and pointed out in the claims.

Figure 1:
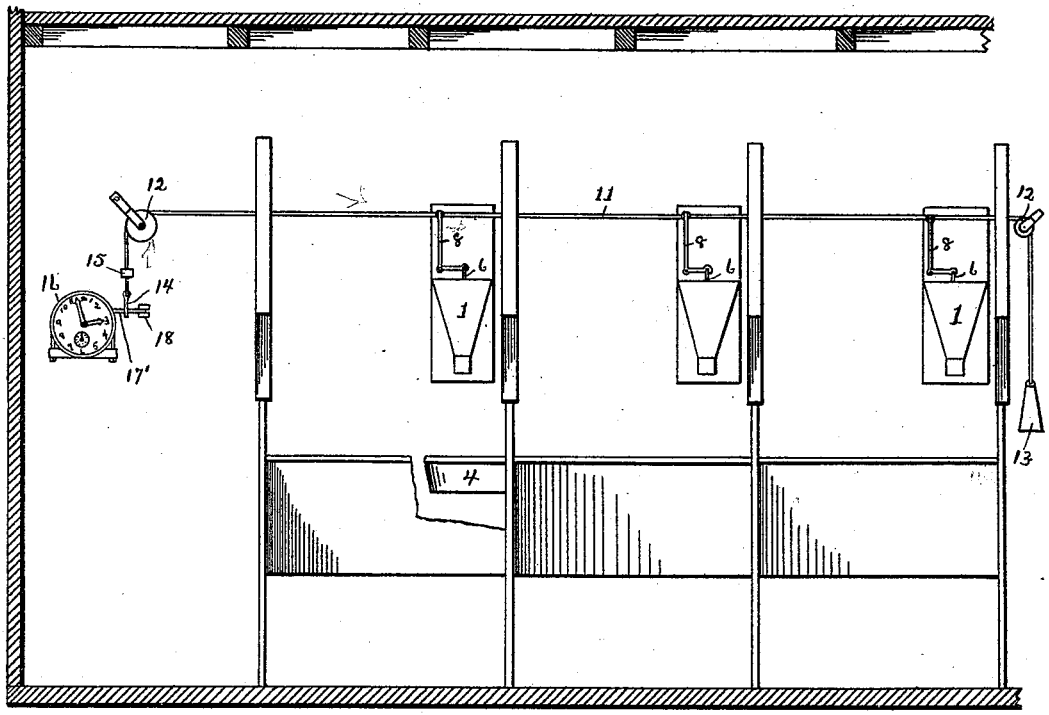
Figure 2:
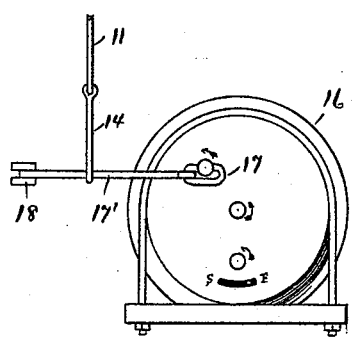
Figure 3:
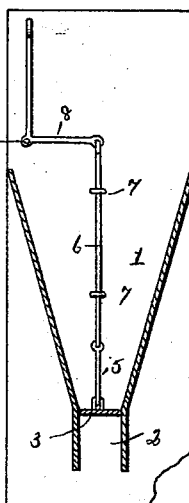
Figure 4:
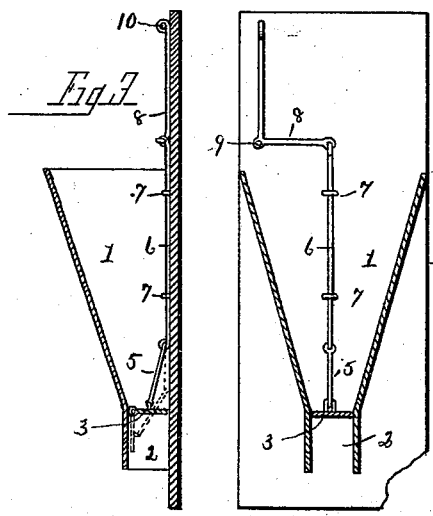

In the drawings:—Figure 1 is a front elevation of a complete feeder arranged to feed three animals at the same time. Fig. 2 is a rear view of the clock showing the arrangement of the tripping mechanism. Fig. 3 is a sectional side elevation of one of the feed boxes showing in full lines the bottom closed, and in dotted lines opened to discharge the feed into the manger. Fig. 4 is a sectional front elevation of the same, showing the bell crank lever and rod for operating the bottom of the feed box.

The main object of my invention is to provide for automatically feeding a number of animals simultaneously by means of mechanism so simple as to be readily understood and manipulated by persons of limited knowledge, of applied mechanics as usually employed in the care of live stock, the simplicity of the construction being such as to cheapen the cost to a minimum.

In carrying out my invention I construct any desired number of feed boxes or chutes 1 having a rectangular bottom portion 2 in which is hinged a valve 3 which when raised closes the bottom of the feed box, and when dropped opens the same to allow the feed contained within the feed box to drop into the manger 4. shown in Fig. 1 in which the feed receptacle is broken away to disclose the manger. The feed receptacle above the rectangular portion 2 is formed with a straight rear side and flaring front and sides to cause the feed to gravitate to the bottom of the receptacle. Valve 3 is connected with a link 5, which in turn is connected with a rod 6 movably secured to the rear side of the feed box by means of staples 7, the upper end of the rod being connected with a bell crank lever 8 pivotally secured at 9 to the back of the feed box, the upper end of the lever 8 being formed with a circular opening 10 through which a rope 11 is passed and secured from movement through the opening when properly adjusted, either by means of stops, or the rope may be tied to the lever. Rope 11 is suspended horizontally above the levers by being passed over pulleys 12 arranged at each side of the stanchions of the stalls a weight 13 being attached to one end, the opposite end being secured to a hook 14 with the rope passed through a staple 15 intermediate the hook and pulley whereby the hook will contact with the staple to limit the movement of the rope when pulled upon by the weight.

16 designates an ordinary alarm clock. To the alarm winding key 17 is secured a trigger 17' the opposite end of the trigger entering an opening formed in a block 18 secured at the side of the stalls when the trigger is projected, but of a length and bearing within the block to be withdrawn when the key 17 is given a one-half turn by the alarm mechanism of the clock.

In operation the clock is wound and the alarm set to the time it is desired to feed the stock, the rope is pulled, to rock the bell crank levers, to close the valves, to feed the boxes, and the end of the trigger is engaged within the opening in block 18, when hook 14 is engaged with the trigger.

When the tripping mechanism has been adjusted, as has been described the feed is placed in the feed boxes, and remains therein until the alarm is actuated, when the revolution of the key will withdraw the trigger and allow the rope to move sufficiently to permit the bell crank levers to rock, and drop the valve in the bottom of the feed box allowing the feed to fall into the manger, when the operation of adjusting the tripping mechanism is repeated.

It will be seen that the device is simple and inexpensive, and that it can be adjusted to all kinds of feed. It will also be seen that the lower arm of the bell crank lever by its connection with the rods attached to the valve acts to push the valve open should there be a liability of the same to stick.

What I claim is—

1. The combination with the feed box, having a valve at its lower end, of a rod and link connected therewith within the feed box, a bell crank lever pivoted to the rear of the feed box and connected at its lower end with the upper end of valve rod, a rope attached to the upper end of bell crank lever, a weight at one end of rope, a hook at the other end and the tripping arm of a clock mechanism.

2. The combination with the feed box, valve, rod and bell crank lever, of the rope and weight the hook at the opposite end of rope, the combined guide and stop staple for said rope and hook, the tripping arm and stop block for holding the tripping arm and other parts in their normal position.

In testimony that I claim the foregoing as my own I hereby affix my signature in presence of two witnesses.

DANIEL McQUEEN.

Witnesses:
WILLIAM WEBSTER,
FLOYD R. WEBSTER.